United States Patent [19]

Herent et al.

[11] Patent Number: 5,068,584
[45] Date of Patent: Nov. 26, 1991

[54] AUXILIARY DEVICE FOR HANDLING FAILURES OF AN ACTUATING SYSTEM OF A LINEAR ELECTRIC ACTUATOR

[75] Inventors: Gérard Herent, Meudon; Michel Mahe, Chaville; Alex Romagny, La Celle Saint-Cloud, all of France

[73] Assignee: Regie Nationale Des Usines Renault, Boulogne-Billancourt, France

[21] Appl. No.: 442,586

[22] Filed: Nov. 29, 1989

[30] Foreign Application Priority Data

Nov. 29, 1988 [FR] France .................................. 88 15555

[51] Int. Cl.[5] .............................................. B62D 5/04
[52] U.S. Cl. ..................................... 318/549; 318/369; 180/79.1
[58] Field of Search .................... 318/2, 131, 159, 160, 318/266, 369, 436, 466, 467, 468, 488, 549, 550, 675; 180/79.1, 140

[56] References Cited

U.S. PATENT DOCUMENTS

| | | | |
|---|---|---|---|
| 4,714,409 | 5/1988 | Westercamp et al. | 180/79.1 |
| 4,770,264 | 9/1988 | Wright et al. | 180/140 |
| 4,782,907 | 11/1988 | Morishita et al. | 180/140 |
| 4,896,737 | 1/1990 | Kanazawa et al. | 180/140 |
| 4,926,955 | 5/1990 | Ohmura et al. | 180/140 |

FOREIGN PATENT DOCUMENTS

| | | | |
|---|---|---|---|
| 61-175183 | 8/1986 | Japan | 180/140 |
| 61-257367 | 11/1986 | Japan | 180/140 |
| 62-139761 | 6/1987 | Japan | 180/79.1 |
| 62-139763 | 6/1987 | Japan | 180/140 |
| 63-203478 | 8/1988 | Japan | 180/140 |
| 8504631 | 10/1985 | PCT Int'l Appl. | . |
| 8804251 | 6/1988 | PCT Int'l Appl. | 180/79.1 |

OTHER PUBLICATIONS

Abstract of Japanese Patent 60-42161 (A), vol. 9, No. 168 (M-396) (1981), Jul. 13, 1985.
Abstract of Japanese Patent 61-77573 (A), vol. 10, No. 249 (M-511) (2305), Aug. 27, 1986.
Abstract of Japanese Patent 61-57465 (A), vol. 10, No. 218 (M-503) (2274), Jul. 30, 1986.

*Primary Examiner*—Bentsu Ro
*Attorney, Agent, or Firm*—Oblon, Spivak, McClelland, Maier & Neustadt

[57] ABSTRACT

An auxiliary device for handling failures of an actuating system of a linear electric actuator, including an auxiliary drive device which works with a braking device, so that, in case of failure of said actuating system, the auxiliary drive device returns the actuator to its zero position and the braking device maintains this position in opposition to any mechanical action.

17 Claims, 3 Drawing Sheets

AUXILIARY DEVICE FOR HANDLING FAILURES OF AN ACTUATING SYSTEM OF A LINEAR ELECTRIC ACTUATOR

BACKGROUND OF THE INVENTION

1. Field of the Invention

This invention relates to an auxiliary device for handling failures of an actuating system of a linear electric actuator which applies in particular to the control of the steering of the rear wheels of a motor vehicle with four wheel steering.

2. Discussion of the Background

Actuating devices for a linear electric actuator are known which make it possible to control a longitudinal movement. In the case of failure, there is no element provided to assure the operation in degraded mode. Further, some devices use a redundancy involving a high cost.

A return to zero of the position of the electric actuator by systems fitted with a spring can be considered, but this involves a significant space requirement, an oversizing of the electric actuator, a good reciprocal efficiency and the return to zero is not controlled.

SUMMARY OF THE INVENTION

Accordingly, the objects of this invention are to provide a new and improved auxiliary device for handling failures of an actuating system of a linear electric actuator which applies in particular to the control of the steering of the rear wheels of a motor vehicle with four wheel steering, and which guarantees an efficient and economic use of necessary energy as well as a small calibration of components while assuring a control of the return to zero of the position of the linear electric actuator and while being compact enough.

These and other objects are achieved according to the present invention by providing a novel auxiliary device for handling failures of an actuating system of a linear electric actuator including an auxiliary motor which works with a brake so that, in case of failure of said actuating device, the auxiliary motor returns said actuator to its zero position and the brake maintains this position in opposition to any mechanical action.

The auxiliary device for handling failures of a linear electric actuator according to the invention thus exhibits the advantage of assuring a control of the return to zero of the position of the electric actuator, while being compact and of a relatively low cost.

BRIEF DESCRIPTION OF THE DRAWINGS

Other characteristics and advantages of this invention will be evident from the description which follows the embodiment given by way of example in reference to the accompanying drawings in which.

DESCRIPTION OF THE PREFERRED EMBODIMENTS

Figure 1:
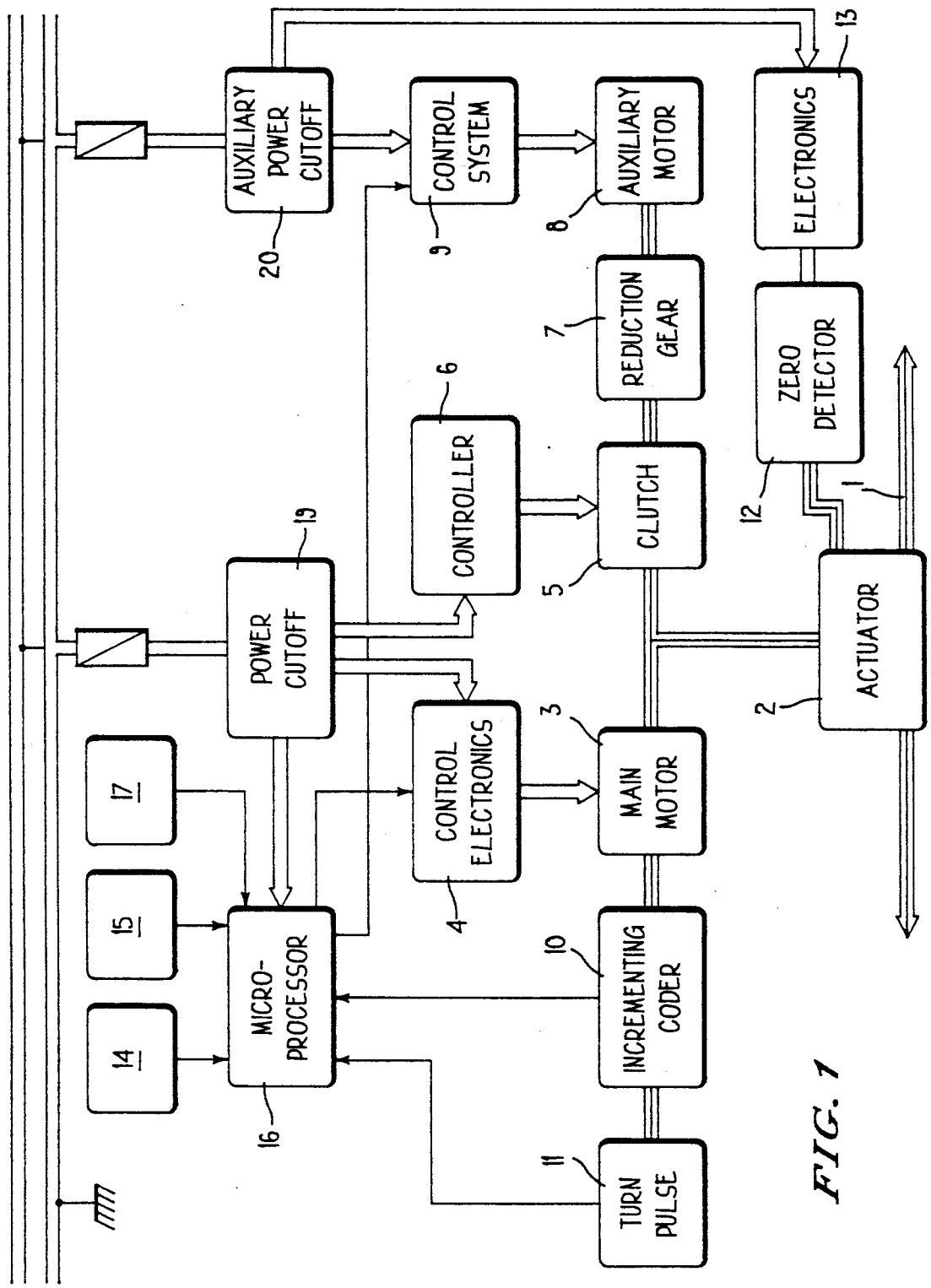
FIG. 1 is a diagram of the device for handling failures according to the invention.

Referring now to the drawings, wherein like references numerals designate identical or corresponding parts throughout the several views, and more particularly to FIG. 1 thereof, an auxiliary device for handling failures of an actuating system of a linear electric actuator according to the invention is shown which comprises auxiliary drive means, which work with braking means, so that, in case of failure of said actuating system, the auxiliary drive means return the actuator to its zero position and the braking means maintain this position in opposition to any mechanical action.

This device can, in particular, apply to the system for steering the rear wheels of a vehicle and it has the function of returning the wheel alignment to zero and the immobilizing or maintenance at zero.

In a first embodiment of the invention, shown in FIG. 1, the actuating system comprises a main motor 3 and auxiliary drive means consist of a small auxiliary motor 8 which works with the braking means. These braking means consist of an irreversible reduction gear 7 which is joined to a power failure clutch 5. Irreversible reduction gear 7 is incorporated in auxiliary motor 8 so as to have an auxiliary geared motor with small space requirement. Power failure clutch 5 makes it possible to isolate auxiliary motor 8 and irreversible reduction gear 7 in normal weather.

Figure 2:
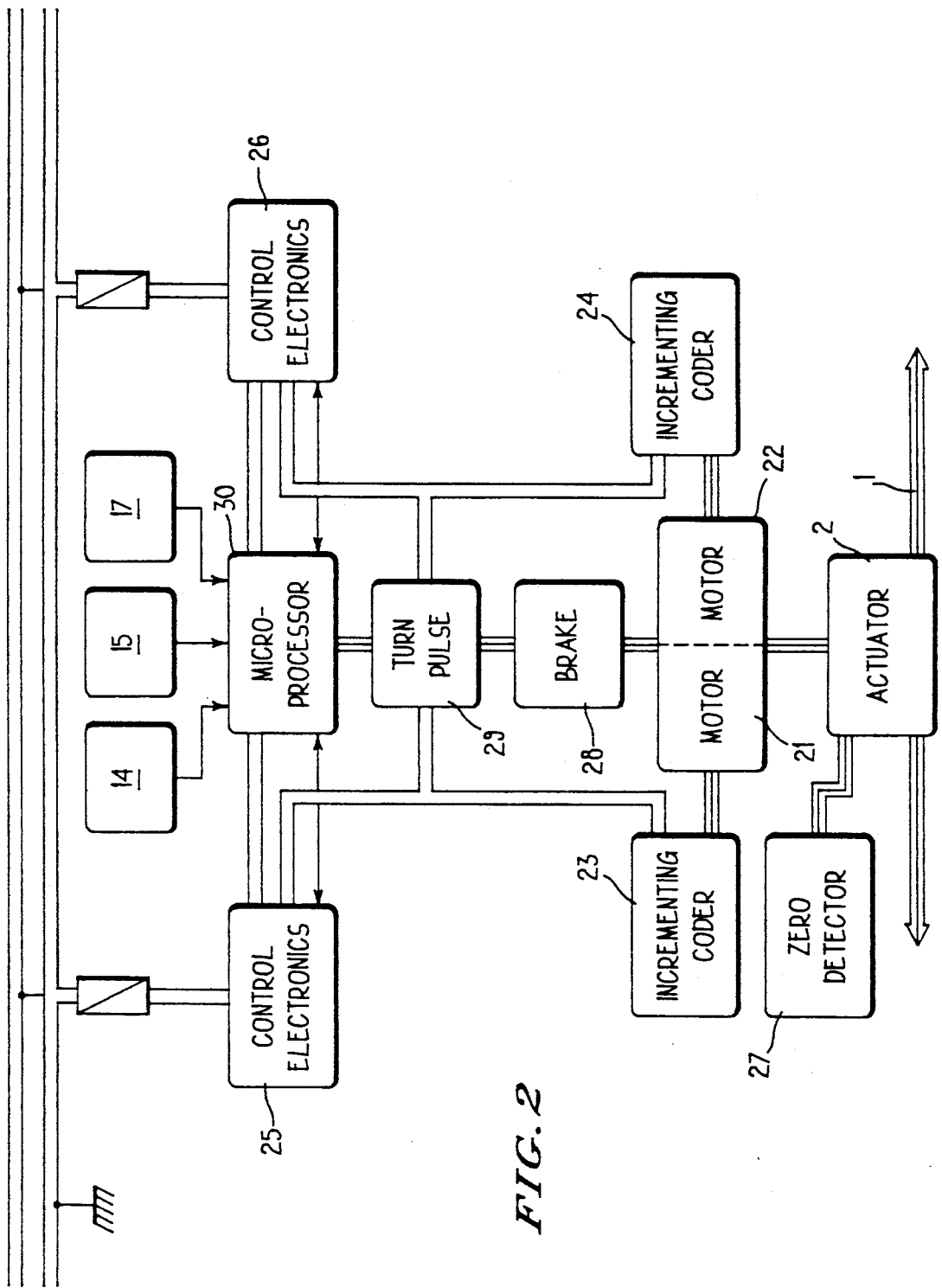
FIG. 2 is a diagram of another embodiment of the device of the invention.

In a second embodiment, shown in FIG. 2, the main electric drive of the actuating system consists of two identical motors 21 and 22 which are mounted in parallel, and which each provide half the torque required. These two motors 21 and 22 are arranged so that, in case of failure of one of the two motors, the good motor carries out the function of the auxiliary drive means as an auxiliary motor. In this case, the good motor then works with the braking means, which consist of a power failure brake 28.

Two motors 21 and 22, which are mounted in parallel, are actually a single motor of the brushless type, with two separate winding groups.

Figure 3:
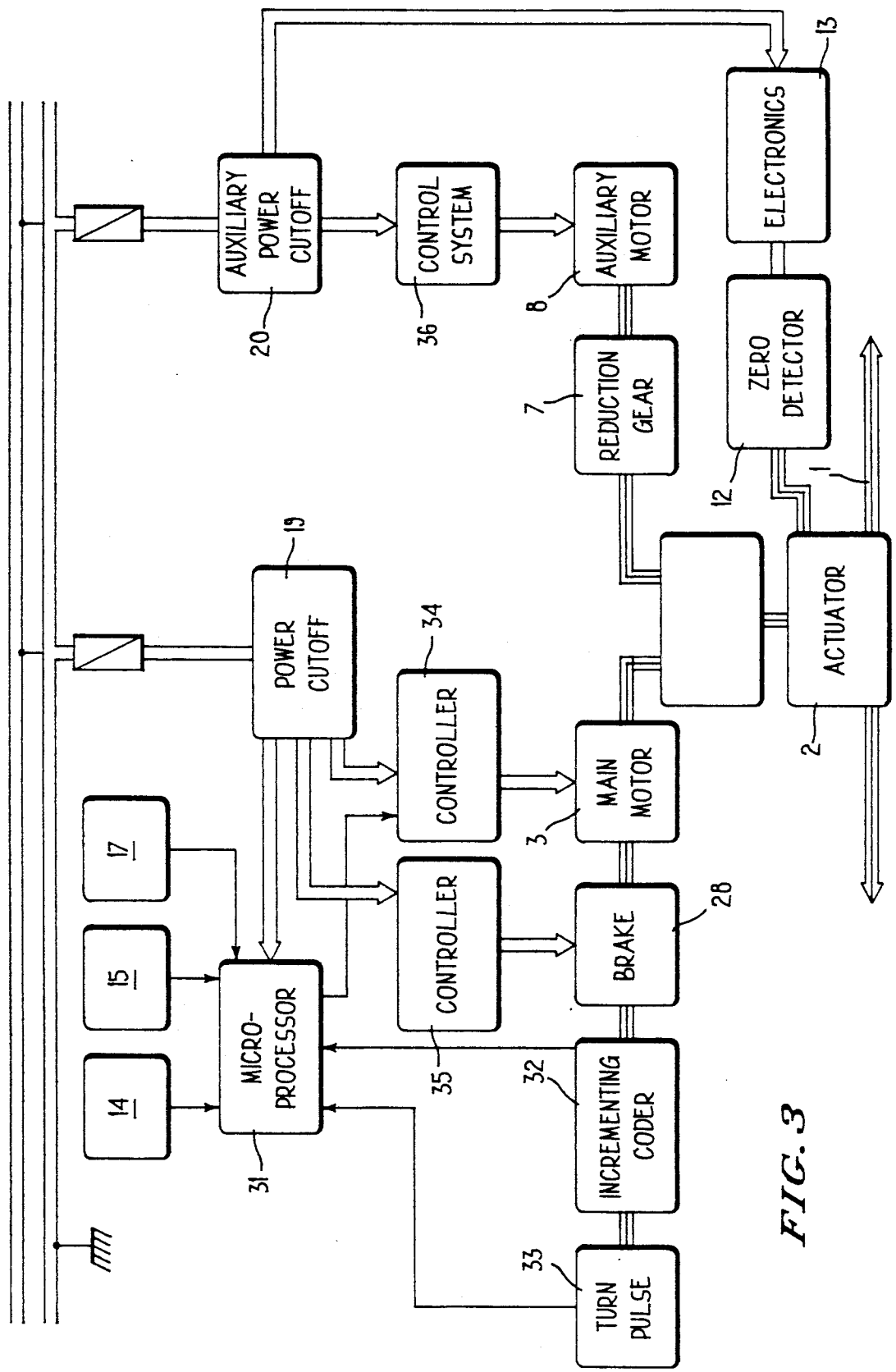
FIG. 3 is a diagram of another embodiment of the device of the invention.

According to a third embodiment of the invention, shown in FIG. 3, the auxiliary drive means consist of a small auxiliary motor 8, which works with the braking means. These braking means comprise an irreversible reduction gear 7, which is mounted at the output of said auxiliary motor 8, and a power failure brake 28. This power failure brake 28 is mounted on one of the outputs of main motor 3 of the actuating system. Irreversible reduction gear 7 and power failure brake 28 are the inputs of a planetary gear train.

Irreversible reduction gear 7 is incorporated in auxiliary motor 8 to have an auxiliary geared motor with small space requirement. Irreversible reduction gear 7 is of the endless screw type and its ring is integral with the inner ring of the planetary gear train 37. The planet gear of the planetary gear train 37 is integral with main motor 3 with its power failure brake 28. The output of the movement of the planetary gear train 37 is carried out by the planet wheel carrier.

The different FIGURES show the device of the invention which apply to a mechanical unit referenced 2 as a whole, actuating the right and left links of the wheels of the vehicle, which are referenced 1 as a whole. In the FIGURES, the connections shown by three parallel lines show the mechanical connections; the connections shown by two parallel lines show the electric power connections, and the connections shown by a single line are the data links.

The first embodiment shown in FIG. 1 comprises a control system of the right main motor and a control system of auxiliary motor 8. The control system of main motor 3 consists of microprocessor 16 which receives the parameters of angle 14 of the steering wheel and speed 15 of the vehicle. It also receives data from an incrementing coder 10 and a turn pulse 11 which gives the position of main motor 3. This makes it possible to control the electric actuator in position by control electronics 4 of said main motor 3. Microprocessor 16 assures control 6 of power failure clutch 5. Control system 9 of auxiliary motor 8 acts by the arrival of a defect signal 17 coming from microprocessor 16. A zero detector 12 of the direction of the position relative to this zero of the actuator works with the data given by incrementing coder 10 and by turn pulse 11. This system gives the position of main motor 3 by incrementing coder 10 and allows the operation of the control system of auxiliary motor 8. A unit for distribution of power cutoffs 19 and a unit for distribution of auxiliary power cutoffs 20 assure the supply of the unit by a fuse protection.

The second embodiment of the invention shown in FIG. 2 has an identical control system of each motor 21 and 22. This control system, which consists of control electronics 25 for motor 21 and control electronics 26 for motor 22, works with a microprocessor 30. This microprocessor 30 receives parameters of the angle of steering wheel 14 and speed 15 of the vehicle. Each control electronics 25 and 26 assures, in parallel, the control in position of the actuator. The arrival of a defect signal 17, coming from microprocessor 30 or from one of the control systems, allows the operation of the latter for the return to the zero position by an incrementing coder 23 or 24 corresponding to the other control system. Each incrementing coder 23 and 24 works with a turn pulse 29. Moreover, a zero detector 27 is mounted on mechanical unit 2.

The third embodiment shown in FIG. 3 comprises a control system of main motor 3, and a control system of auxiliary motor 8. The control system of main motor 3 consists of a microprocessor 31, which receives the parameters of angle 14 of the steering wheel and speed 15 of the vehicle. It also receives data giving the position of main motor 3 so as to control the electric actuator in position by control electronics of said main motor 3. Microprocessor 31 assures control 35 of brake 28 and control 34 of main motor 3. Control system 36 of auxiliary motor 8 acts by the arrival of a defect signal 17 coming from microprocessor 31. A direction detector of the position relative to the zero of the actuator, i.e. a zero detector 12 with its electronics 13, works with the data given by incrementing coder 32 and turn pulse 33, which give the position of main motor 3 and allow the operation of control system 36 for auxiliary motor 8.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. An auxiliary device for handling failures of an actuating system of a linear electric actuator, comprising:
   auxiliary drive means for returning said actuator to a zero position in case of failure of said actuating system; and
   braking means for maintaining said actuator in said zero position in opposition to any mechanical action;
   wherein said actuating system comprises a main motor, said auxiliary drive means comprises a small auxiliary motor and said braking means comprises an irreversible reduction gear joined to a clutch.

2. A device as recited in claim 1, wherein said irreversible reduction gear is incorporated into said auxiliary motor to create an auxiliary geared motor that can operate under conditions with small space requirements.

3. A device as recited in claim 2, wherein said clutch comprises a power failure clutch that isolates said auxiliary motor from said irreversible reduction gear in normal weather.

4. A device as recited in claim 1, wherein said clutch comprises a power failure clutch that isolates said auxiliary motor from said irreversible reduction gear in normal weather.

5. A device as recited in claim 1, further comprising:
   a first control system for controlling said main motor;
   a second control system for controlling said auxiliary motor; and
   a detector for detecting a direction of a position of said actuator relative to said zero position of said actuator;
   wherein said first control system comprises:
   a microprocessor which receives data including speed of a vehicle to which said actuating system is attached, angle of a steering wheel of said vehicle and position of said main motor;
   control electronics connected to said microprocessor for controlling the position of said actuator;
   a controller interacting with said microprocessor for controlling said clutch; and
   said microprocessor actuates said second control system after said microprocessor detects a defect signal.

6. An auxiliary device for handling failures of an actuating system of a linear electric actuator, comprising:
   auxiliary drive means for returning said actuator to a zero position in case of failure of said actuating system;
   braking means for maintaining said actuator in said zero position in opposition to any mechanical action; and
   a main electric drive comprised of two motors mounted in parallel, each of said motors providing one half of a torque provided by said main electric drive, wherein upon a failure of one of said two motors, the nonfailing motor functions as said auxiliary drive means.

7. A device as recited in claim 6, wherein said two motors comprise a single brushless motor with two separate winding groups.

8. A device as recited in claim 7, wherein said braking means comprises a power failure brake.

9. A device as recited in claim 6, wherein said braking means comprises a power failure brake.

10. A device as recited in claim 6, further comprising:
    a microprocessor which receives parameters including speed of a vehicle to which said actuating system is attached and an angle of a steering wheel of said vehicle;
    identical control systems for each of said two motors connected to said microprocessor;
    wherein said control systems control in parallel the position of said actuator and return said actuator to said zero position after said microprocessor detects a defect signal, and upon failure of either control system, the nonfailing control system returns said actuator to said zero position by means of an incrementing coder.

11. An auxiliary device for handling failures of an actuating system of a linear electric actuator, comprising:
   auxiliary drive means for returning said actuator to a zero position in case of failure of said actuating system; and
   braking means for maintaining said actuator in said zero position in opposition to any mechanical action;
   wherein said actuating system includes a main motor;
   said auxiliary drive means comprises a small auxiliary motor; and
   said braking means comprises an irreversible reduction gear mounted at an output of said auxiliary motor and a brake mounted on an output of said main motor, said reduction gear and said brake being inputs of a planetary gear train.

12. A device as recited in claim 11, wherein said brake comprises a power failure brake.

13. A device as recited in claim 11, wherein said irreversible reduction gear is incorporated into said auxiliary motor to create an auxiliary geared motor that can operate under conditions with small space requirements.

14. A device as recited in claim 11, wherein said irreversible reduction gear comprises an endless screw gear having a ring integral to an inner ring of said planetary gear train, said planetary gear train includes a planet gear integrally mounted with said main motor, and said main motor includes a power failure type brake, movement of said planetary gear train is carried out by a planet wheel carrier.

15. The device as recited in claim 11, further comprising:
   a first control system for controlling said main motor including:
   a microprocessor which receives parameters including speed of a vehicle to which said actuator is attached, an angle of a steering wheel of said vehicle and a position of said main motor:
   control electronics connected to said microprocessor for controlling the position of said actuator; and
   a controller for controlling said brake;
   a second control system for controlling said auxiliary motor actuated by said microprocessor after said microprocessor detects a defect signal; and
   a direction detector for detecting a direction of a position of said actuator relative to said zero position of said actuator.

16. An auxiliary device for handling failures of an actuating system of a linear electric actuator, comprising:
   auxiliary drive means including an auxiliary motor for returning said actuator to a zero position in case of failure of said actuating system;
   braking means for maintaining said actuator in said zero position in opposition to any mechanical action; and
   zero detecting means for detecting a direction of a position of said actuator relative to said zero position;
   wherein said actuating system comprises a main motor;
   said braking means comprises an irreversible reduction gear joined to a power failure clutch that isolates said auxiliary motor from said irreversible reduction gear in normal weather; and
   said irreversible reduction gear is incorporated into said auxiliary motor to create an auxiliary geared motor that can operate under conditions with small space requirements.

17. A device as recited in claim 16, further comprising:
   a first control system for controlling said actuating system; and
   a second control system for controlling said auxiliary drive means;
   wherein said first control system comprises:
   a microprocessor which receives data including speed of a vehicle to which said actuating system is attached, angle of a steering wheel of said vehicle and position of said actuating system; and
   control electronics connected to said microprocessor for controlling the position of said actuator; and
   wherein said microprocessor actuates said second control system after said microprocessor detects a defect signal.

* * * * *